United States Patent
Ahya et al.

(10) Patent No.: US 7,230,930 B2
(45) Date of Patent: Jun. 12, 2007

(54) MODE SHIFTING COMMUNICATIONS SYSTEM AND METHOD

(75) Inventors: Deepak P. Ahya, Plantation, FL (US); Sriram K. Kaushik, Bangalore (IN); Satyanarayana Tummalapenta, Bangalore (IN)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/806,990

(22) Filed: Mar. 23, 2004

(65) Prior Publication Data

US 2005/0213518 A1     Sep. 29, 2005

(51) Int. Cl.
*H04B 7/005*     (2006.01)
*H04B 1/44*     (2006.01)
*H04L 5/16*     (2006.01)
*H04M 3/42*     (2006.01)

(52) U.S. Cl. .................. 370/278; 370/282; 370/296; 379/202.01; 379/406.01

(58) Field of Classification Search ........ 370/276–278, 370/282, 290, 296, 260–261; 379/202.01, 379/406.01; 455/416
See application file for complete search history.

(56) References Cited

U.S. PATENT DOCUMENTS

| | | | |
|---|---|---|---|
| 4,821,310 A | 4/1989 | Lynk, Jr. et al. | |
| 5,175,872 A | 12/1992 | Borras | |
| 5,825,755 A * | 10/1998 | Thompson et al. | 370/296 |
| 6,366,567 B1 * | 4/2002 | Singh et al. | 370/296 |
| 6,563,804 B1 * | 5/2003 | Iyer et al. | 370/296 |
| 6,606,305 B1 * | 8/2003 | Boyle et al. | 370/260 |
| 6,898,436 B2 * | 5/2005 | Crockett et al. | 455/518 |
| 7,170,863 B1 * | 1/2007 | Denman et al. | 370/260 |
| 2003/0016632 A1 * | 1/2003 | Refai et al. | |
| 2004/0008680 A1 * | 1/2004 | Moss et al. | |
| 2004/0187109 A1 * | 9/2004 | Ross et al. | 718/100 |

OTHER PUBLICATIONS

U.S. Appl. No. 10/261,871, filed Oct. 1, 2002, Mellone et al.

* cited by examiner

*Primary Examiner*—Chi Pham
*Assistant Examiner*—Melanie Jagannathan
(74) *Attorney, Agent, or Firm*—Scott M. Garrett

(57) ABSTRACT

A digital network based communications system that establishes communications sessions to communicate via a simulated circuit-switch environment. Exemplary embodiments communicate between a first communications station (104) and a second communications station (106) using Voice over Internet Protocol (VOIP) techniques. Calls are setup (700), maintained and torn down (800) using Session Initiation Protocol and Session Description Protocol messages. Call modes are able to be changed between duplex and simplex without disconnection. Duplex calls are also able to be interrupted with a request for a simplex call. A receiver (104) engaged in a duplex call can receive a request for a simplex call, accept the simplex call or send a response message, and then resume the duplex call, all while maintaining the duplex call data communications session.

20 Claims, 6 Drawing Sheets

MODE SHIFTING COMMUNICATIONS SYSTEM AND METHOD

FIELD OF THE INVENTION

The present invention generally relates to the field of electronic communications devices and more particularly to communications devices that operate over a data network and are able to change communications modes.

BACKGROUND OF THE INVENTION

Electronic communications, particularly for voice communications, are able to operate in several modes. Two popular communications modes are Simplex and Duplex. Duplex mode communications between two or more devices involve transmission and reception at each station that is either actually or apparently simultaneous. Duplex mode communications simulate face-to-face communications as all participants constantly receive all input from other participants, even while he or she is talking.

Simplex mode communications, on the other hand, operate by having only one participant transmit at a time. Simplex mode communications often use a "Push-To-Talk" (PTT) metaphor similar to a "walkie-talkie." A participant who desires to talk generally presses a button on his or her device and begins talking. Each participant in a simplex mode communication session then receives that transmission. Simplex mode communications have the advantages of faster call set up, since call setup processing is usually within the control of the wireless network, and "floor control" provides a mechanism for clear "command and control" communications. A problem with simplex mode communications arises if multiple persons desire to talk at the same time. In such a case, a "PTT" collision occurs and can result in both transmitters transmitting PTT collisions which can result in garbled or missed communications. Alternatively, a system-wide controller can be provided and configured to arbitrate such collisions. Even in the case of PTT collision arbitration, a participant who is denied the opportunity to talk will be dissatisfied, especially when involved in a heated discussion.

Data communication networks are increasingly used to carry voice communications. Such networks, such as Internet Protocol (IP) networks, provide a flexible communications structure to adaptively communicate data and voice as needed by one or more enterprises. Data networks are being deployed with combinations of wired and wireless nodes, or stations, that are able to communicate data and voice freely among wired and wireless stations. Such networks, however, are generally set up as either a simplex call or a duplex call and changing a call's mode requires tearing down and re-starting the same call in a different mode. This delays communications between or among the participants.

Therefore a need exists to overcome the problems with the prior art as discussed above.

SUMMARY OF THE INVENTION

According to an embodiment of the present invention, a method for communicating among at least two devices over a data network establishes a voice communications session in a session over a data link between a first station and at least one remote station. The session operates in a first mode that is one of a simplex mode and a duplex mode. The method also sends a control command over the data link to change from the first mode to a second mode, where the second mode is a mode that is different from the first mode. The method further changes, while maintaining the session, the session from the first mode to the second mode.

In another aspect of the present invention, a method for communicating among at least three devices includes establishing a duplex communications session over a data link between a first station and a second station, accepting a request from a third station for a simplex communications session with the first station, and responding at the first station to the request by establishing a simplex session from the first station to the third station while maintaining the duplex communications session.

In a further aspect of the present invention, a wireless communications controller has a call initiation controller that establishes a voice communications session in a session over a data link between a first station and at least one remote station. The session operates in a first mode that is one of a simplex mode and a duplex mode. The wireless communications controller further has a mode change controller that performs one of sending and receiving a control command over the data link to change from the first mode to a second mode, the second mode being a mode different from the first mode. The wireless communications controller further has a mode controller that changes, while maintaining the session, the session from the first mode to the second mode.

In a further aspect of the present invention, a wireless communications controller has a call initiation controller that establishes a duplex communications session over a data link between a first station and a second station. The wireless communications controller further has a call request receiver that accepts a request from a third station for a simplex communications session with the first station. The wireless communications controller further has a second call session controller that responds to the request by establishing a simplex session from the first station to the third station while maintaining the duplex communications session.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

Figure 1:
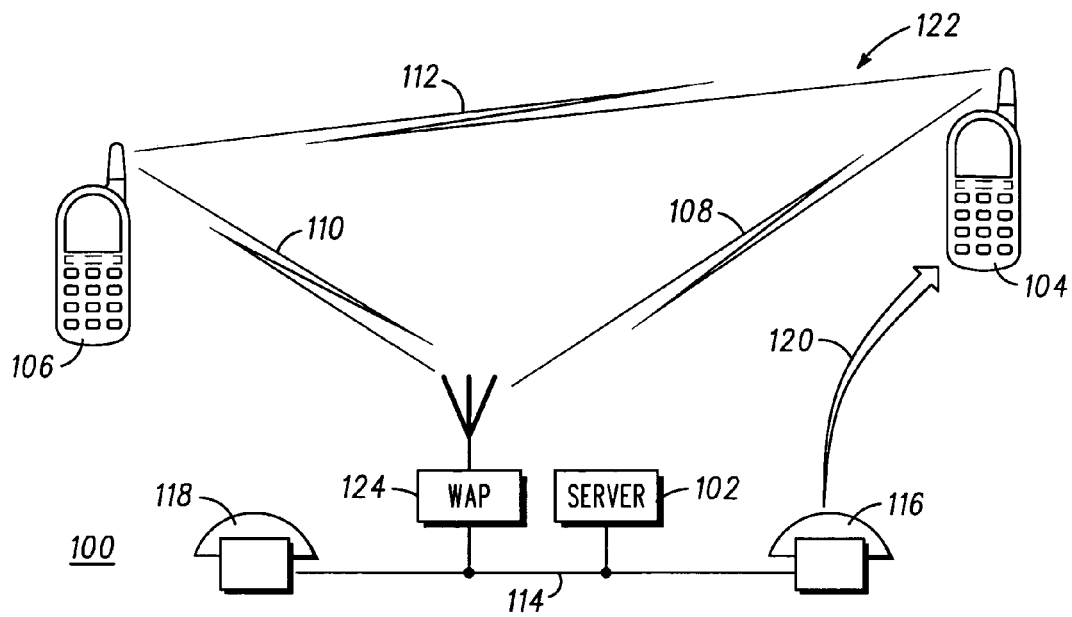
FIG. 1 illustrates an exemplary communications network that incorporates embodiments of the present invention.

FIG. 1 illustrates an exemplary communications network 100 that incorporates embodiments of the present invention. The exemplary communications network 100 incorporates both wireless communications stations, such as wireless handset A 104 and wireless handset B 106, and wired communications stations, such as wired communications station A 116 and wired communications station B 118. The exemplary communication network 100 includes a network infrastructure that has a wired network backbone 114 and a wireless LAN infrastructure 122. Wireless LAN infrastructure 122 allows wireless communications stations, such as wireless handset A 104 and wireless handset B 106, to communicate with one or more wireless access points (WAP) 124 through, for example, wireless link A 108 and wireless link B 110. Some embodiments of the present invention further allow wireless stations to wirelessly communicate directly with each other, such as via direct wireless link 112. The exemplary communications network 100 further includes a server 102 that is able to provide central control and/or administration of communications links between or among two or more stations.

The communications stations of the exemplary communications network 100 are able to communicate with one other using the Internet Protocol (IP). Communications stations are able to exchange data and/or voice communications over IP, as is known by practitioners of ordinary skill in the relevant arts. Voice communications sessions between two or among three or more communications stations are able to be initiated, maintained and modified by a variety of protocols. Although the communications stations in the exemplary embodiment are connected over an IP network, communications sessions implemented to establish calls between and among communications stations appear to be circuit switched connections to the users.

Exemplary embodiments of the present invention utilize the Session Initiation Protocol (SIP) and the Session Definition Protocol (SDP). A version of the SIP is defined by RFC 2543 and RFC 3261, and a version of the SDP is defined in RFC 2327. RFCs 2543, 3261 and 2327 are published by the Internet Engineering Task Force. RFC 2543, 3261 and 2327 are hereby incorporated herein by reference. Alternative embodiments of the present invention adapt the teachings of the present invention to operate with other data network communications protocols. The SIP protocol messages used in the exemplary embodiment are directed through a central administrative server, such as server 102.

Figure 2:
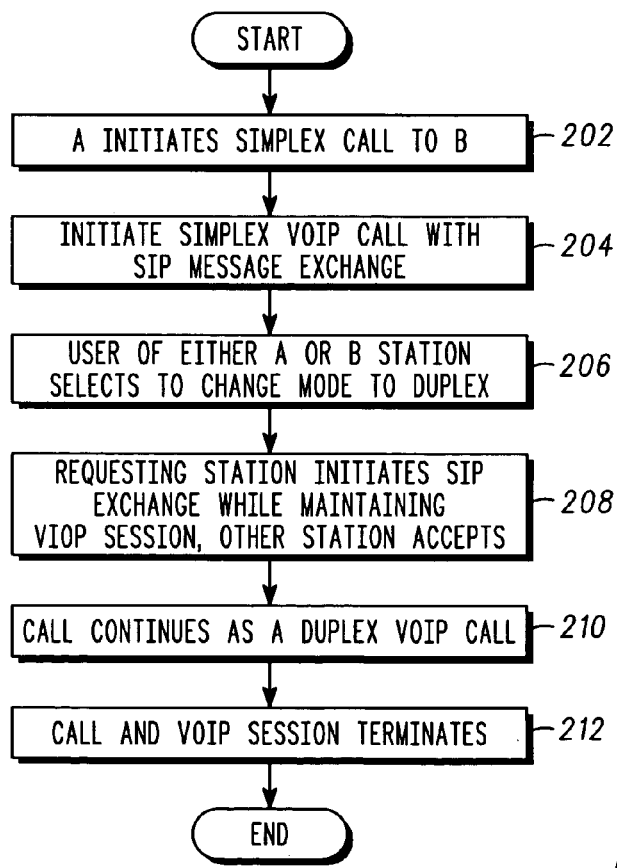
FIG. 2 illustrates a call mode change processing flow diagram for an exemplary embodiment of the present invention.

FIG. 2 illustrates a call mode change processing flow diagram 200 for an exemplary embodiment of the present invention. The call mode change processing allows two or more users who are engaged in a communications session operating in one mode, for example in a simplex mode, to rapidly and easily change the mode of that communications session to another mode, such as to a duplex mode.

The call mode change processing begins by user A initiating, at step 202, a simplex call with one or more other terminals, such as to user B. The following discussion describes communications between two stations in order to provide a clearer and simpler description of the operation of this exemplary embodiment of the present invention. It is to be understood that all communications sessions are able to include two or more than two communications stations and that this description of a communications session between two communications station is in no way limiting.

After user A initiates a simplex call to user B, the processing then initiates, at step 204, a simplex Voice over IP (VOIP) call with a communications station associated with user B. This call is initiated in the exemplary embodiment through the use of SIP and SDP messages, as is described below. The users engage in a simplex call and at some point decide that they prefer to enter a duplex calling session. One of the users involved in the communications session is able to select, at step 206, a change in the mode of the session by, for example, pressing a pre-defined button on the communications station. Once one of the users selects to change the mode of the communications session, the processing of the requesting communications station initiates, at step 208, an SIP and SDP message exchange to change the mode of the current communications session, as is described in detail below. It is to be noted that the IP session for this VOIP exchange is maintained throughout this mode change. The processing of the exemplary embodiment advantageously allows the mode of the communications session to change without the user's noticing an interruption in service. The call then continues, at step 210, as a duplex call. The users are then able to terminate, at step 212, the call, and the VIOP session, by ending the call through the normal procedure for duplex calls.

Figure 3:
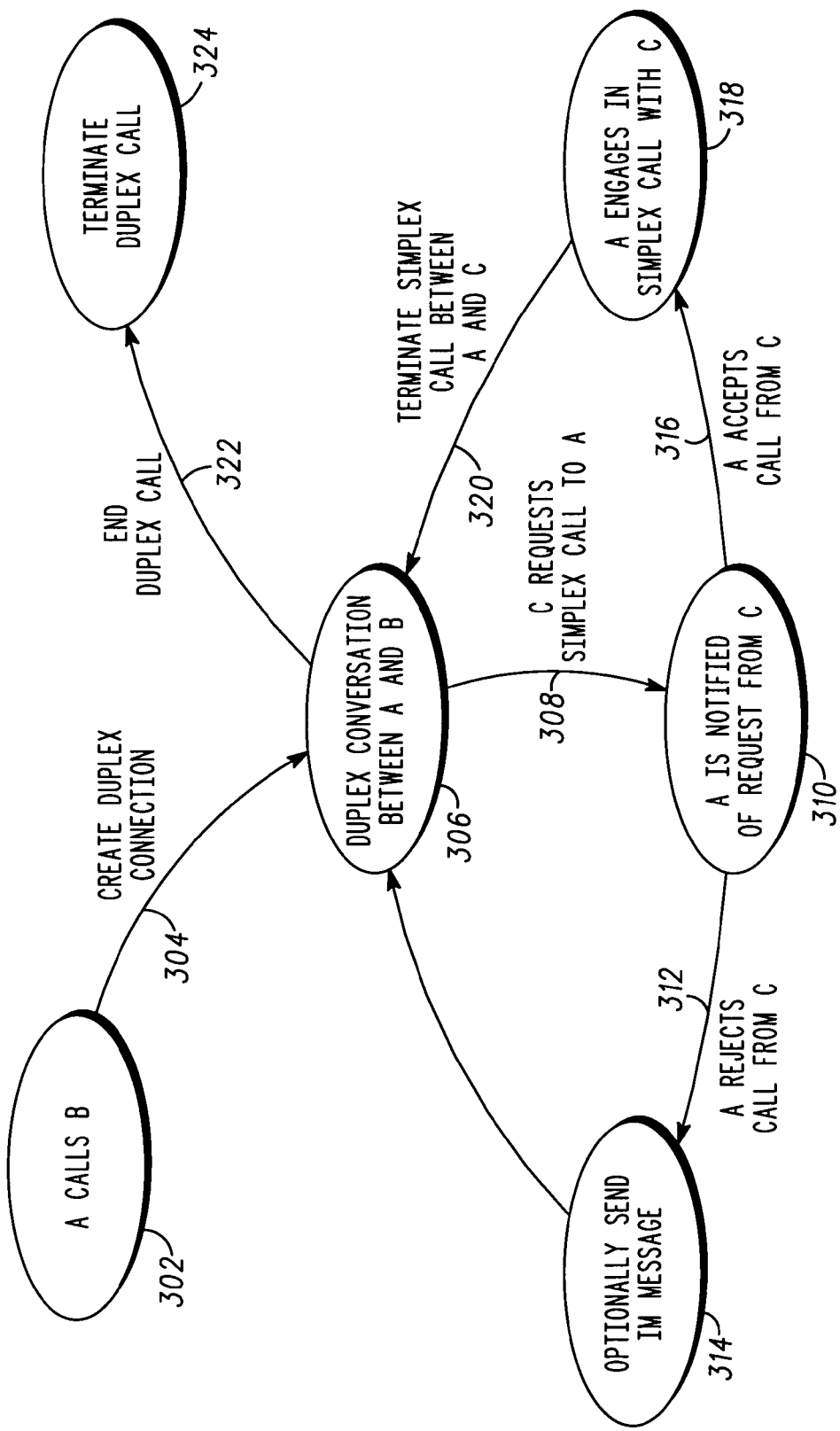
FIG. 3 illustrates a simplex call interruption state transition diagram according to an exemplary embodiment of the present invention.

FIG. 3 illustrates a simplex call interruption state transition diagram 300 according to an exemplary embodiment of the present invention. The initial state for the operation of this aspect of the present invention is placing an initial call state 302, wherein user A, for example using wireless handset A 104, calls user B, who for example is using wireless handset B 106. This call is placed and initiated by the create duplex connection transition 304 using messages conforming to the SIP, as is described below. The processing then remains in a duplex conversation between user A and user B state 306. In this state, the two users converse in a duplex mode communications session.

While in the duplex conversation between user A and user B state 306, the system allows a third user, for example using wired communication station A 118, to send a request for a simplex communications session to user A. The third user in this description is referred to as user C. The request by user C triggers the C requests simplex call to A state transition 308 to transition to the A is notified of request from C state 310. User A is notified of this call request and is presented with an opportunity to accept or decline the simplex communications session call request from user C. User A can accept the call and trigger the A accepts call from C state transition 316 to change the state to the user A engages in simplex call with User C state 318. This simplex session call ends at some point and the terminate simplex call between user A and user C state transition 320 is triggered and causes the state to return to the duplex conversation between A and B state 306.

If user A decides, in the A is notified of request from C state 310, to reject the simplex call request, the A rejects call from C state transition 312 is triggered and the optionally send Instant Message (IM) state 314 is entered. User A in this exemplary embodiment is able to configure text messages that are able to be automatically sent to a requestor of a simplex call session, such as user C in this example, if user A rejects a request for a simplex call. This message is able to be further customized to select a special message if user A is engaged in another call, such as the duplex communication session call of this example. Some embodiments of the present invention incorporate communications stations that allow user A to enter a text message or select from a list of pre-defined text messages and have that message sent to the requestor of the simplex communication session. Yet further embodiments of the present invention allow a voice message to be sent to the requestor of the simplex communications session. After this IM or other text message is sent, the processing transitions back to the duplex conversation between A and B state 306. When the duplex communication session call terminates, the users end the duplex communications session and trigger the end duplex call state transition 322 and enter the terminate duplex call state 324.

Figure 4:
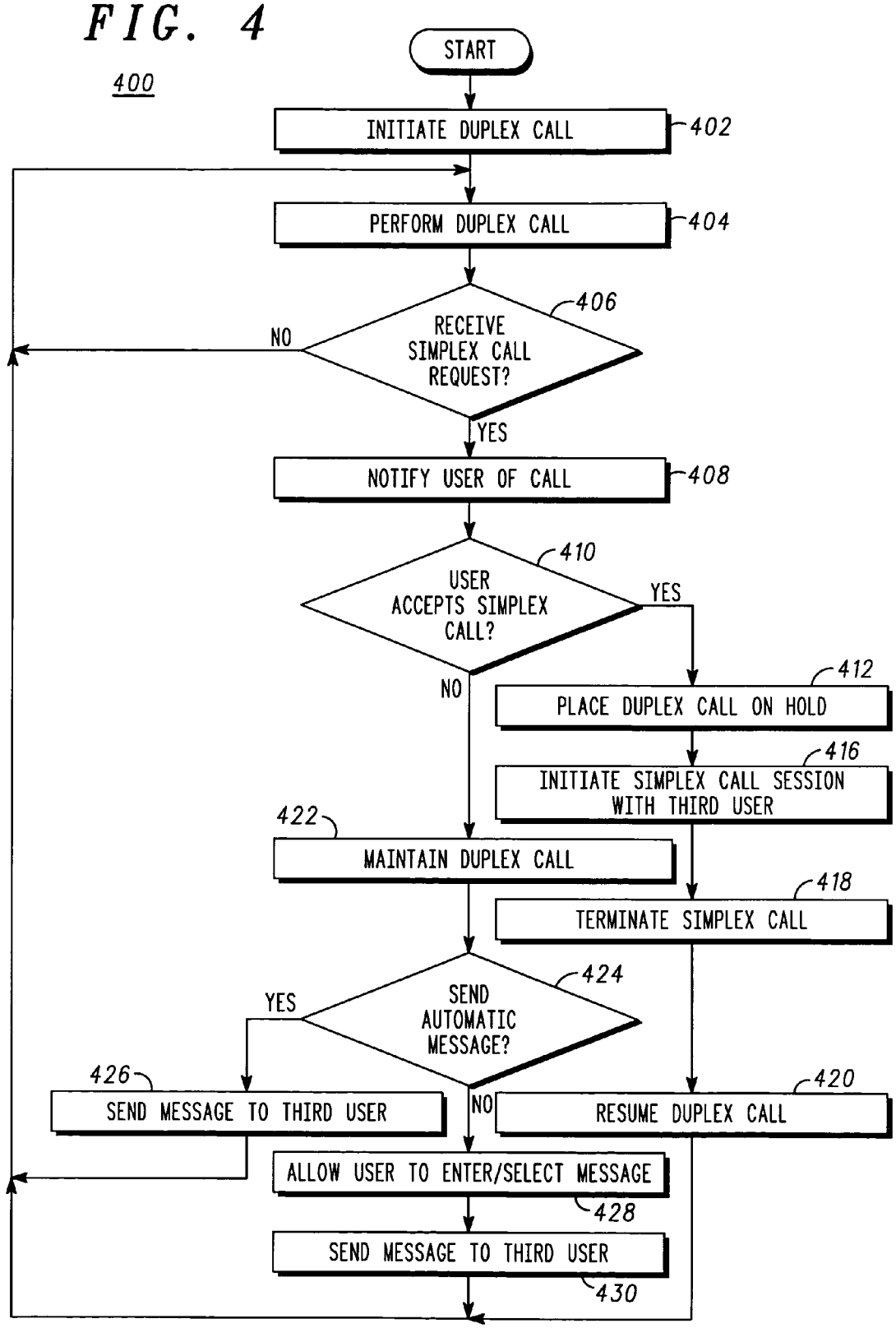
FIG. 4 illustrates an exemplary call processing flow diagram as is performed by an exemplary embodiment of the present invention.

FIG. 4 illustrates an exemplary call processing flow diagram 400 as is performed by an exemplary embodiment of the present invention. This exemplary call processing is performed by a communications station, such as wireless handset A 104, in the exemplary embodiment. This processing is equally able to be performed by a wired or wireless communication system that is suitably configured to communicate over a data network to one or more remote communications stations involved in the call. The exemplary call processing begins by initiating, at step 402, a duplex call with one or more other communications stations. The other communications stations are able to be one of a wireless communications station, such as wireless handset B 106, or a wired communications station, such as wired station A 116. This duplex call is able to be initiated by either the user of this communications station or by a user of another communications station that is calling this user. The exemplary embodiment of the present invention initiates this duplex call by exchanging messages that conform to the SIP and SDP protocols, as is described below.

Once a duplex call is established, the processing performs, at step 404, the duplex call. The duplex call is performed by exchanging IP data packets according to a suitable Voice over IP (VOIP) protocol, such as a real time protocol (RTP), as is known to practitioners of ordinary skill in the relevant arts. While performing the duplex call, the processing of the exemplary embodiment monitors to determine, at step 406, if a simplex call request has been received. The exemplary embodiment of the present invention allows a remote terminal that is not engaged in a communications session with this station to transmit a simplex call request to this communication station via an IP message packet that conforms to the SIP protocol, as is described below. If a simplex call request is not received, the processing continues with the duplex call.

If a request for a simplex call is received, the processing advances to notifying, at step 408, the user that a request for a simplex call has been received. This notification in the exemplary embodiment includes providing a configurable visual and/or audible indication to the user of the communications station. The communications station of the exemplary embodiment is able to be configured to provide various indications as part of this notification. The user is also provided with a way of accepting or rejecting the incoming simplex call request, such as by pressing a specified button on the keypad of the communications station, as is described below.

The processing then determines, at step 410, if the user of the communications station has selected to accept the incoming simplex call request. If the user has selected to not accept the simplex call, the processing advances to maintaining, at step 422, the current duplex call. The call is maintained in the processing of the exemplary embodiment by the exchange of SIP/SDP messages that are described below. This processing effectively puts the duplex call on hold, but maintains the IP session for this call over the data network.

The processing then advances to determine, at step 424, if an automatic message is to be sent in response to the simplex call request. The communications station of this embodiment is able to be configured with an automatic message that is to be sent to a remote communications station that is requesting to establish a communications session. This automatic response is able to be, for example, a voice message or a text message, that is sent to the remote station over the data network connected to this communications station. If it is determined that an automatic message is to be sent to the communications station sending the simplex call request, the processing then sends, at step 426, the preconfigured automatic message. If it is determined that an automatic message is not to be sent, the processing advances to allow, at step 428, the user of the communications station to enter or select a pre-defined message to send to the station sending the request. The processing accepts the user entered or selected message, which is a text message in the exemplary embodiment, and sends, at step 430, the message to the user sending the simplex call request.

If the user did decide to accept the request for a simplex call from a third user, the processing then places, at step 412, the duplex call on hold. This is performed in the exemplary embodiment by exchange of SIP/SDP messages over the data network to which this communications station is connected, as is described below. The processing then initiates, at step 416, a simplex call session with the third user. This simplex call session is initiated and maintained by the exchange of SIP/SDP messages over the data network to which this communications station is connected, as is described below. The users then carry on a discussion over a simplex call session and at some point end that call. When the users select to end this call, such as by pressing a pre-defined button on the communications station, the processing terminates, at step 418, the simplex call. This is similarly performed with the use of SIP/SDP packets, as is described below. The processing then resumes, at step 420, the duplex call that was previously in progress. This call is resumed through the exchange of SIP/SDP packets over the data network to which the communications station is connected. The processing then returns to performing, at step 404, the duplex call.

Figure 5:
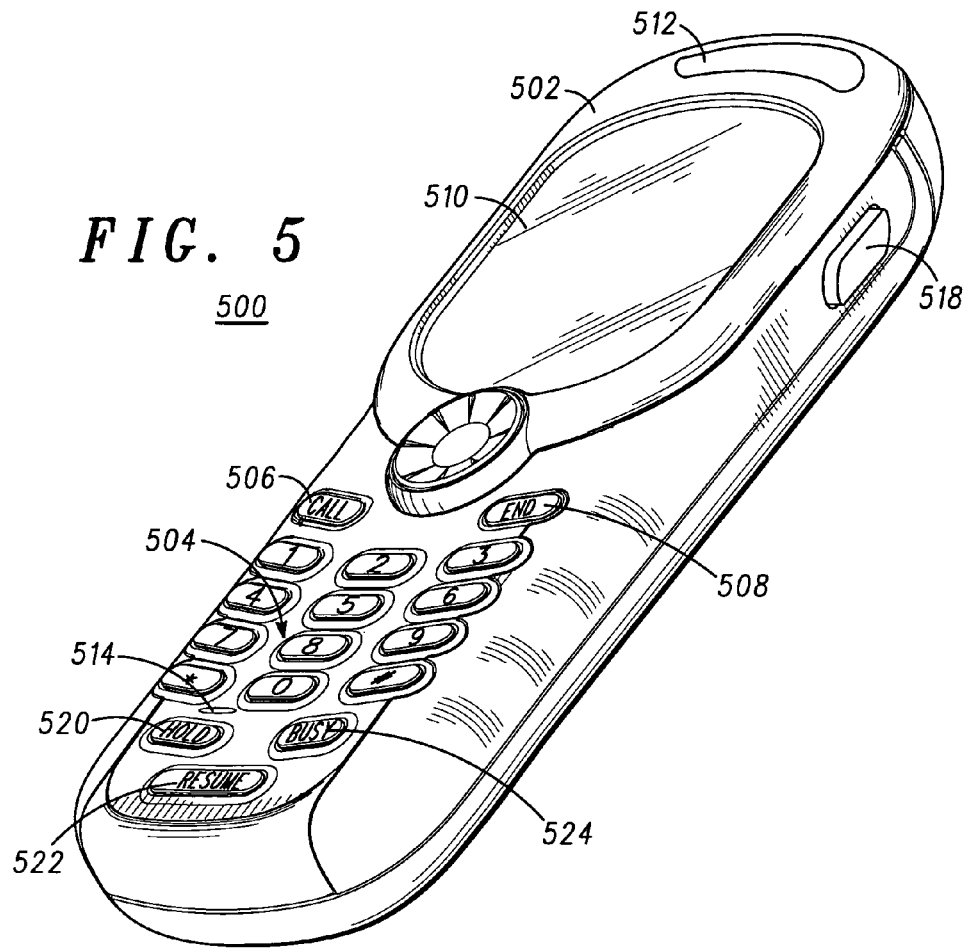
FIG. 5 illustrates a front view of a wireless handset according to an exemplary embodiment of the present invention.

FIG. 5 illustrates a front view of a wireless handset 500 according to an exemplary embodiment of the present invention. Wireless handset 500 is a wireless communications station, similar to wireless handset A 104 or wireless handset B 106, that is in wireless communications with a Wireless LAN infrastructure such as the exemplary communications network 100. The wireless handset 500 has a display 510 that displays text and/or graphical messages and data to the user. The wireless handset 500 further has a key pad 504 that allows a user to enter numbers and/or data. A microphone 514 and earpiece 512 are used to support voice communications through the wireless handset 500. The user interface and electronics of the wireless handset 500 are contained within a case 502 in this example.

The user of the wireless handset 500 controls calls and features of the exemplary embodiment of the present invention through the use of various buttons on wireless handset 500. Key pad 504 is used to enter numbers and can be used to enter alphanumeric data. A "Call" button 506 and an "End" button 508 are included to perform conventional as well as specialized functions, as is described below. Special buttons are also provided in this exemplary embodiment to control features of this embodiment of the present invention. A "Hold" button 520, a "Resume" button 522 and a "Busy" button 524 are used to perform specialized functions during a call, as is described below. The wireless handset 500 further has a Push-To-Talk (PTT) button 518 to facilitate simplex calling, as is known to practitioners of ordinary skill in the relevant arts.

Figure 6:
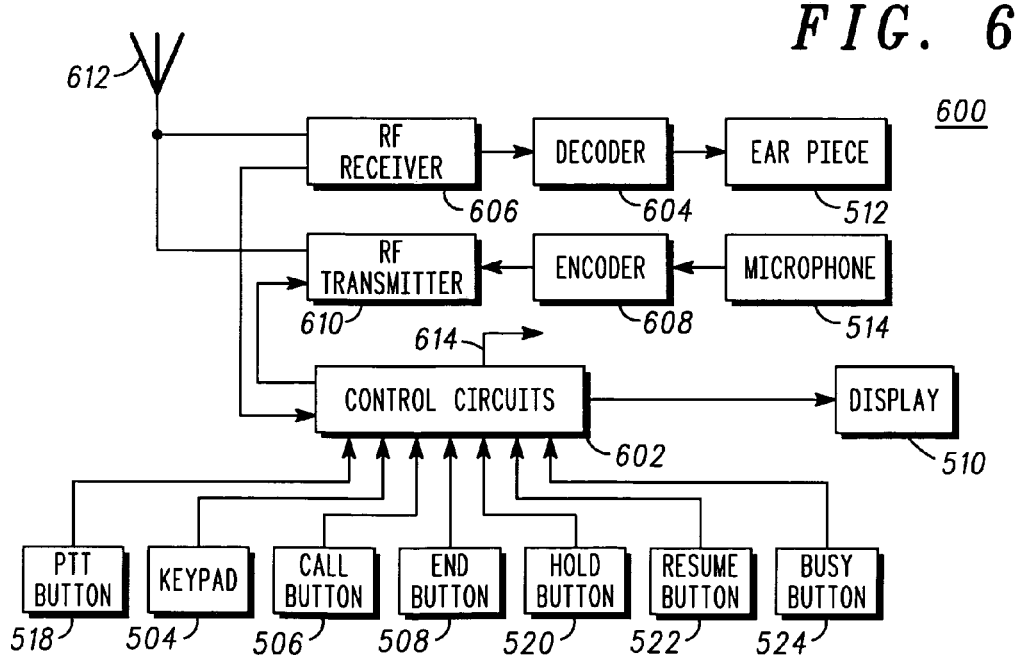
FIG. 6 illustrates a wireless communications station schematic diagram according to an exemplary embodiment of the present invention.

FIG. 6 illustrates a wireless communications station schematic diagram 600 according to an exemplary embodiment of the present invention. The wireless communications station 600 is similar to the wireless handset 500 described above, and the wireless handset A 104, and further the wireless handset B 106 also illustrated above. The exemplary wireless communications station schematic diagram 600 includes an RF receiver 606 for receiving RF signals and producing detected digital data output. The detected digital data output includes encoded voice data and received network control messages. Encoded voice data is sent to a decoder 604 for decoding and processing required to produce an analog voice output that is delivered to earpiece 512. The RF receiver delivers received network control messages to the control circuits 602 for further processing.

The exemplary wireless communications station schematic diagram 600 also includes an RF transmitter 610 that is used to produce and modulate an RF signal for transmission from the station. The RF transmitter transmits encoded voice data that is produced by the voice encoder 608 based upon audio signals produced by the microphone 514. The RF transmitter 610 further transmits network control messages that are generated by the processing of control circuits 602. The RF transmitter 610 and the RF receiver 606 use a common RF antenna 612 in the exemplary embodiment. The common RF antenna 612 may be shared through RF sharing and/or switching means, in a manner well known to those of ordinary skill in the art, to allow both transmit and receive wireless communications over one or more communication channels. For example, some embodiments of the present invention utilize diplexers to allow simultaneous transmit and receive operations, while others utilize time division multiplexing techniques to alternate transmit and receive functions. Wired communications stations have a similar schematic diagram with the RF transmitter 610 and the RF receiver 606 replaced by appropriate network interface circuits for the particular wired network configuration.

Control circuits 602 of the exemplary embodiment include a programmable processor (and/or controller) that normally includes a computer readable medium that contains programming instructions required to control the communications station. Control circuits 602 receive and process received network control messages and produce required network control messages to implement communications protocols, including the network control message exchanges described herein. The control circuits 602 also receive input from the buttons of the wireless handset 500, such as the PTT button 518, keypad 504, call button 506, end button 508, hold button 520, resume button 522 and busy button 524. Control circuits 602 further control the processing components of the wireless handset through a control interface 614. Control circuits 602 further provide control of the encoder 608, decoder 604, RF receiver 606 and RF transmitter 610 as is described below, as well as is required for all operation of the wireless handset 500. Control circuits 602 perform the functions of a call initiation controller, a mode change controller, a mode controller, a call request receiver and a second call session controller in the exemplary embodiment.

Figure 10:
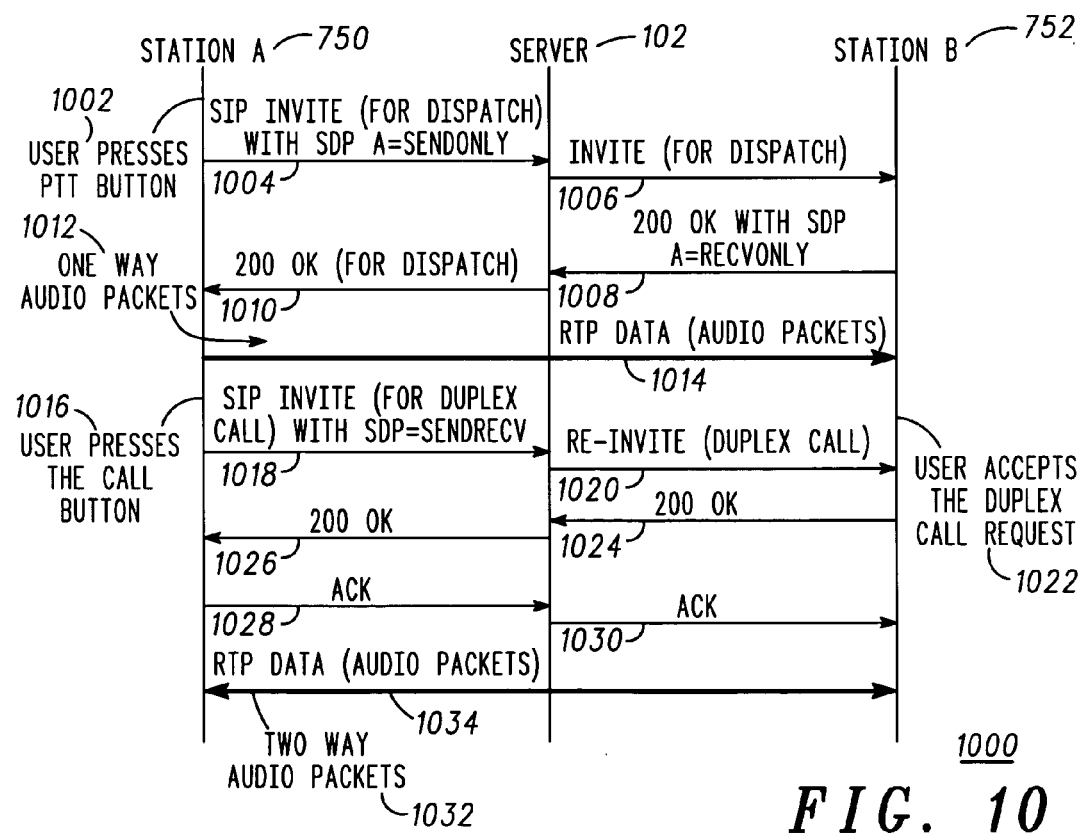
FIG. 10 illustrates a call mode change network control message exchange according to an exemplary embodiment of the present invention.

FIG. 10 illustrates a call mode change network control message exchange 1000 according to an exemplary embodiment of the present invention. This exemplary call mode change processing begins by the operator of station A 750 selecting a destination communications station to call, such as by dialing a number, and pressing, at 1002, the PTT button 518 to initiate a simplex call. In response to this, station A 750 sends, at 1004, an INVITE SIP message to server 102. An associated SDP message for the INVITE SIP message describes the audio details and the type of the call. This SDP message has "a=sendonly" since this is a simplex call. The RTP media module (RTP) in station A 750 is initialized with the encoder part of the RTP processing enabled as the station will be only sending encoded audio packets. Server 102 relays, at 1006, this INVITE SIP message to station B 752. When station B 752 receives the INVITE SIP message representing the simplex call request, station B 752 sends, at 1008, a "200 OK" SIP message to server 102, and server 102 relays, at 1010, that "200 OK" SIP message to station A 750. The "200 OK" SIP message sent by station B 752 indicates the RTP port for the session and station A 750 is then able to send audio packets, at 1012, to station B 752. Station A 750 is then granted the floor to talk as it has initiated the call. RTP audio packets are then exchanged, at 1014.

At some point, the users of station A 750 and station B 752 decide they wish to change the mode of their call from simplex to duplex. In the exemplary embodiment of the present invention, all that is necessary is for one of the users, for example either the user of station A 750 or station B 752, to press the call button 506 and a re-INVITE SIP message (i.e., an INVITE SIP message with the same call session details) is sent, at 1018, to the server 102. Server 102 then relays it, at 1020, to the other communications station. This re-INVITE SIP message contains an SDP message body with "a=sendrecv." The same RTP port is specified in this re-INVITE SIP message and therefore there is no disconnection of the call or re-connection between the two calling parties. The media path is established even before the signaling part of the call conversion is complete and hence, the users are able to change communication mode from simplex to duplex just by pressing a button.

When the re-INVITE SIP message is sent, the RTP module in the originating communications station is configured to enable both the encoder and decoder modules so as to allow simultaneous encoding of the out going audio packets and decoding of the incoming audio packets, thereby being in a state ready for duplex communications. Some embodiments of the present invention suspend the RTP session after the transmission of the re-INVITE SIP message until a "200 OK" response is received, and then the RTP starts the vocoder processing for the duplex call. The other communications station, station B 752 in this example, receives this re-INVITE SIP message and the user of that communications station accepts the change in call mode. When the user of station B 752 accepts the mode change, the RTP module in station B 752 is configured to enable both the voice encoder and decoder modules in order to enable simultaneous encoding of the out going audio packets and decoding of the incoming audio packets. Station B 752 responds by sending a "200 OK" SIP message, at 1024, to server 102, which then relays it, at 1026, to station A 752. Station A 750 acknowledges this by sending, at 1028, an ACK SIP message to server 102, which relays it to station B 752. The communications stations then exchange, at 1032, two way audio packets and perform a duplex communications mode call, at 1034.

Figure 7:
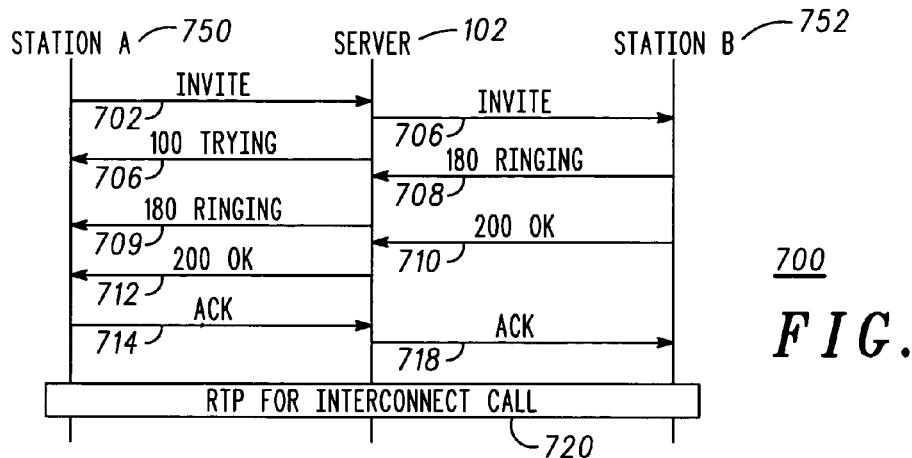
FIGS. 7-9 illustrate an exemplary call processing network message exchange diagram depicting messages that are communicated to implement an aspect of the present invention.
Figure 8:
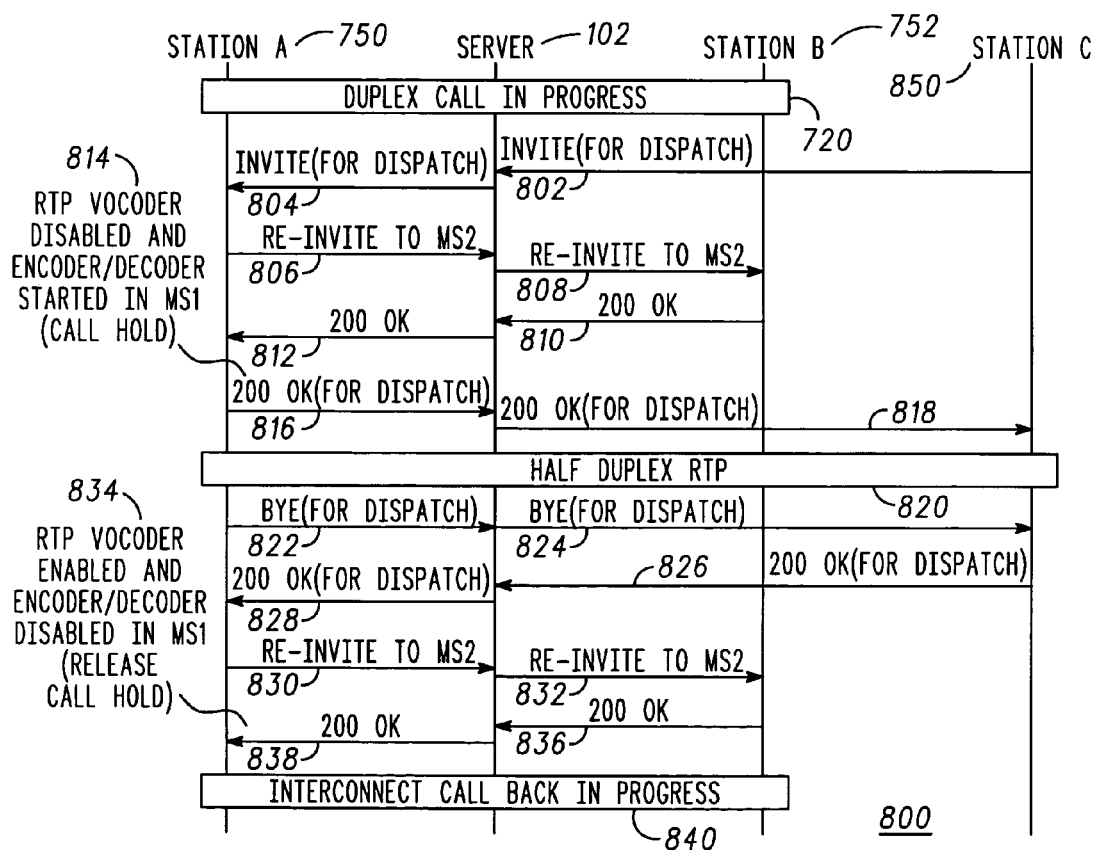
Figure 9:
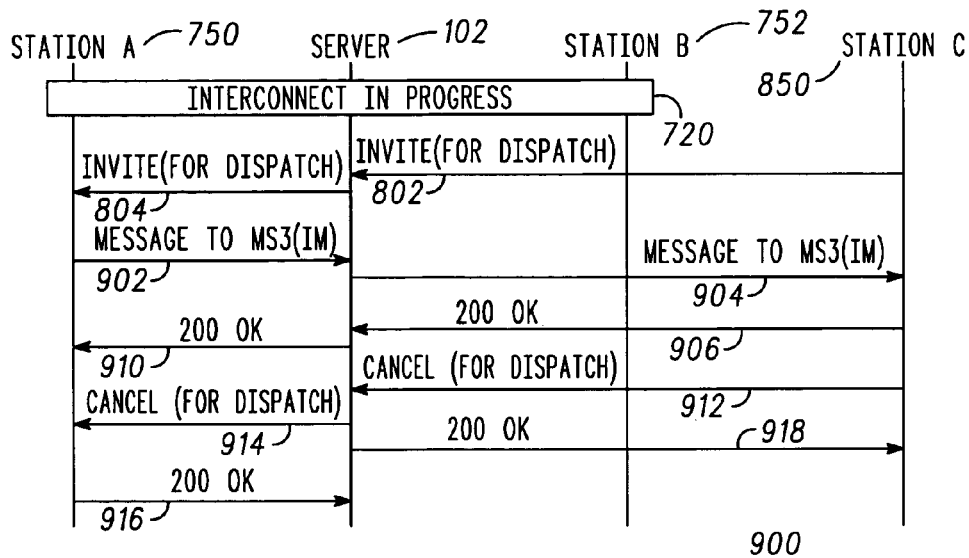

FIGS. 7-9 illustrate an exemplary call processing network message exchange diagram depicting messages that are communicated to implement an aspect of the present invention. This exemplary network message exchange diagram illustrates network control messages that are exchanged among three communications stations, which are user devices, and a central server 102. Central server 102 of this exemplary embodiment is used to control communications between and among user devices, including call setup, call maintenance and call tear-down functions. The following description discusses point-to-point calls between two user devices in order to more clearly describe the operation of this exemplary embodiment of the present invention. It is clear that the principals described herein are equally applicable to operations that include conference calls among multiple user devices or communications stations.

The example case illustrated in FIGS. 7-9 include voice calls made between three stations, Station A 750, Station B 752 and Station 3 850. Each of these stations is able to be a wired or wireless IP based communications system.

FIG. 7 illustrates a duplex call setup message exchange diagram 700, according to an exemplary embodiment of the present invention. This exemplary embodiment of the present invention transmits messages defined by the Session Initiation Protocol (SIP) and the Session Description Protocol (SDP). These messages are transmitted in this exemplary embodiment between communications stations and a central server 102. The central server 102 performs conventional network management functions such as restricting access to authorized users, verification of user accounts, billing, and other such functions. Additionally, server 102 performs the call initialization, set-up, resource management, maintenance and tear down processing described herein. Further embodiments of the present invention utilize distributed server architectures across one or more networks. Yet further embodiments of the present invention operate on a peer-to-peer basis without a controller by passing network control messages directly to remote communications stations.

Station A 750 and Station B 752 in this exemplary embodiment are able to be wired or wireless network communications devices that support voice communications over a digital network protocol. This exemplary embodiment utilizes the Internet Protocol (IP) to exchange data packets between and among various communications stations. The use of wired and wireless IP communications stations is interchangeable in the discussions of these exemplary embodiments. The communications stations of the exemplary embodiments include voice encoders and decoders that are used to encode and decode.

The duplex call setup message exchange diagram 700 illustrates the network control messages that are exchanged by the exemplary embodiment of the present invention to set up a duplex call. A duplex call is initiated in this example by a user of station A 750. In response to a call initiation, which is performed for example by pressing a telephone number on the keypad 504 and pressing the call button 506, station A 750 sends, at 702, an SIP INVITE message to server 102. Server 102 verifies and validates the call request and determines the call destination, which is station B 750 in this example. Server 102 relays, at 704, the SIP INVITE message to station B 752. Server 102 further sends, at 706, a "100 Trying" SIP message back to Station A 750. Station B 752 sends, at 708, a "180 Ringing" SIP message that is relayed, at 709, to station A 750. Once a user of station B 752 accepts the call, for example by pressing the call button 506, station B responds by sending, at 710, a "200 OK" SIP message to the server 102. The server 102 relays, at 712, that "200 OK" SIP message to station A 750. Station A 750 responds by sending, at 714, an ACK SIP message to the server 102, which relays, at 718, the ACK SIP message to station B 750. The control circuits 602 of station A 750 and station B 752 configure the voice encoder 608 and decoder 604, as well as other circuits, to properly implement, at 720, a Real Time Protocol (RTP) session for a duplex voice call over IP.

FIG. 8 illustrates a duplex call interruption network control message exchange 800 as is implemented by an exemplary embodiment of the present invention. The duplex call interruption network control message exchange 800 begins with an in-process duplex call, at 720, being performed via an RTP data exchange between station A 750 and station B 752. This duplex call was established as described above. While performing this duplex call, a third communications station, station C 850, attempts to initiate a simplex call with station A 750. This call is initiated, for example, by a user of station C 850 entering a proper destination number and pressing the PTT button 518. In response to this user initiation of a simplex call, the processing of station C 850 sends, at 802, an INVITE SIP message to the server 102 indicating a simplex call request to station A 750. The server verifies and validates this INVITE SIP message and relays it, at 804, to station A 750. In the exemplary embodiment, server 102 repeatedly sends this simplex INVITE SIP message to station A 750 when station A 750 is engaged in a duplex call with another station.

After receipt of the INVITE SIP message by station A 750, the user of station A 750 is able to accept the simplex call request. The user of station A 750 is able to press the Hold button 520 to place the current duplex call on hold and indicate acceptance of the incoming simplex call. Station A 750 in turn sends a "re-INVITE" SIP message to server. In this context, an INVITE message with the same existing call session details is referred to as re-INVITE in SIP terminology. The SDP message is set to have the value "a=sendonly." Setting "a=sendonly" signifies that station A 750 is requesting the call duplex call to be put on HOLD and does not intend to send any audio packets in this session.

The server 102 then forwards, at 808, the re-INVITE request SIP message to station B 752. Station B 752, upon receiving this request, acknowledges the 'HOLD' request represented by the re-INVITE message and stops sending audio packets to station A 750. The HOLD request is acknowledged by sending, at 810, a "200 OK" SIP message to server 102 with its SDP message containing 'a=recvonly'. Server 102 then relays, at 812, this "200 OK" SIP message to station A 750.

After station A 750 essentially places its initial duplex call on HOLD, station A 750 then accepts the simplex call from station C 850. Station A 750 acknowledges the INVITE SIP message received from station C 850 (for the simplex call) by sending, at 816, a "200 OK" SIP message to server 102 and sets up a RTP port for listening to the incoming messages from station C 850. Server 102 relays that "200 OK" SIP message to station C 850. Station C 850, after getting the confirmation for the simplex call, then continues with the simplex call, at 820. The voice decoder 604 and encoder 608 are configured, at 814, to disable the duplex call RTP vocoder and enable a simplex call encoder/decoder.

At some point, the users of station A 750 and station C 850 decide to terminate the simplex call. In this example, the user of station A 750 decides to terminate the simplex call by, for example, pressing the end button 508. Station A 750 then transmits, at 822, a BYE SIP message to server 102 for the simplex call session. Server 102 relays, at 824, this BYE SIP message to station C 850, which acknowledges it, at 826, by sending a "200 OK" SIP message to the server 102, which relays it, at 828, to station A 750. This exchange of the BYE SIP message and "200 OK" SIP message results in the termination of the RTP port for the simplex communications session.

Station A 750 then re-initiates the duplex call that was put on hold. The user of station A 750 presses the 'RESUME' button 522 and station A 750 sends, at 830, a re-INVITE SIP message to server 102 with an SDP message containing "a=sendrecv," thereby confirming that it would like to re-initiate the duplex call that was put on hold. The server 102 then forwards, at 832, the re-INVITE request for re-initiating the call that was initially put on hold to station B 752. Station B 752 then acknowledges, at 836, the re-INVITE SIP message with a "200 OK" SIP message with an SDP message containing "a=sendrecv," indicating that the current duplex call is put off hold. The voice decoder 604 and encoder 608 are configured, at 834, so as to enable a duplex call RTP vocoder and disable the simplex call encoder/decoder. The duplex call then resumes, at 840, with the RTP ports that were configured for the previously configured duplex session at 720.

FIG. 9 illustrates an alternative simplex call response message exchange 900 according to an exemplary embodiment of the present invention. In this alternative response to a request for a simplex call from station C 850 to station A 750 while the user of station A 750 is engaged in a duplex call, the user of station A 750 decides to reject the simplex call request and sends a text message to station C 850. This alternative response network control message exchange has an initial state similar to the duplex call interruption network control message exchange 800. The alternative simplex call response message exchange 900 begins with a duplex call in progress, at 720, and with station C 850 sending, at 802, an INVITE SIP message to the server 102, which is then relayed, at 804, to station A 750. The user of station A 750 is notified of this received request, such as by an audible tone. The user of station A 750 then selects to not accept the simplex call and, for example, presses the "BUSY" button 524. After the "BUSY" button 524 is pressed, the user of station a 750 is presented with a set of customized or pre-stored text replies that can be sent in response to the simplex call request. The user of station A 750 then selects a text reply and the processing of station A 750 forms a MESSAGE SIP message containing this text reply and sends, at 902, this MESSAGE SIP message to server 102 as a reply to the simplex call request from station C 850. The MESSAGE SIP message is a reply in the existing call session that was started with the simplex call request initiated by station C 850. This MESSAGE SIP message is then relayed, at 904, to station C 850. Station C 850 receives this MESSAGE SIP message and displays the text message to the user of station C 850. When the user of station C 850 receives and reads the message stating that the user of station A 750 is busy on a call and would like the user of station C 850 to call him or her back after that call, the user of station C 850 disconnects the current simplex call and station C 850 signals this by transmitting, at 912, a cancel SIP message to server 102. Server 102 relays, at 914, this cancel SIP message to station A 750. Station A 750 responds to this cancel SIP message by sending, at 916, a "200 OK" SIP message to server 102, which is then relayed, at 918, to station C 850. Station A 750 then continues the duplex call with station B 752. The user of station A 750 is then able to call the user of station C 850 after having completed this duplex call.

As discussed above, a simplex call is initiated by station A 750 sending an INVITE SIP message for a simplex call with station B 752. The server 102 determines if station B 752 is registered and active. Server 102 then alerts station 752 with an incoming dispatch call. The INVITE message generally has a standard header as defined in RFC3261. However, in order to achieve a shorter call set up time, the INVITE SIP message can be truncated to have only the mandatory headers in a short form. This INVITE SIP message contains an SDP message that has one of its fields set to "a=sendonly," which relates to media being set to simplex mode. Once station B 752 receives the INVITE SIP message and accepts the simplex call, the media between the communications stations is established and the initiator of the call (station A 750 in this example) will have the floor control. Once station A 750 releases the floor, station B 752 can grab the floor and start talking in a simplex mode.

TABLE 1 illustrates the contents of a typical INVITE SIP message used to initiate a simplex call.

TABLE 1

INVITE sip:bob@biloxi.com SIP/2.0
    Via: SIP/2.0/UDP pc33.atlanta.com;branch=z9hG4bK776asdhds
    Max-Forwards: 70
    To: Bob <sip:bob@biloxi.com>
    From: Alice <sip:alice@atlanta.com>;tag=1928301774
    Call-ID: a84b4c76e66710@pc33.atlanta.com
    CSeq: 314159 INVITE
    Contact: <sip:alice@pc33.atlanta.com>
    Content-Type: application/sdp
    Content-Length: 142
    v=0
    o=mhandley 2890844526 2890842807 IN IP4 126.16.64.4
    s=SDP Seminar
    i=A Seminar on the session description protocol
    u=http://www.cs.ucl.ac.uk/staff/M.Handley/sdp.03.ps
    e=mjh@isi.edu (Mark Handley)
    c=IN IP4 224.2.17.12/127
    t=2873397496 2873404696
    a=sendonly
    m=audio 49170 RTP/AVP 0

In response to the INVITE SIP message illustrated in TABLE 1, a receiving communications station responds with a "200 OK" SIP message such as the example illustrated in TABLE 2.

TABLE 2

SIP/2.0 200 OK
    Via: SIP/2.0/UDP server10.biloxi.com
        ;branch=z9hG4bKnashds8;received=192.0.2.3
    Via: SIP/2.0/UDP bigbox3.site3.atlanta.com
        ;branch=z9hG4bK77ef4c2312983.1;received=192.0.2.2

TABLE 2-continued

```
Via: SIP/2.0/UDP pc33.atlanta.com
    ;branch=z9hG4bK776asdhds ;received=192.0.2.1
To: Bob ;tag=a6c85cf
From: Alice ;tag=1928301774
Call-ID: a84b4c76e66710@pc33.atlanta.com
CSeq: 314159 INVITE
Contact:
Content-Type: application/sdp
Content-Length: 131
v=0
o=mhandley 2890844526 2890842807 IN IP4 126.16.64.4
s=SDP Seminar
c=IN IP4 124.2.17.12/127
t=2873397496 2873404696
a=recvonly
m=audio 49170 RTP/AVP 0
```

As illustrated in these exemplary SIP messages, the initiator of the call sends an INVITE SIP message that has "a=sendonly" as the SDP message which signifies that its going to be a simplex call. In response, the callee responds with a "200 OK" SIP message that has 'a=recvonly' as the SDP message option, signifying that the callee will initially only receive the audio packets.

In order to convert a simplex mode call into a duplex mode call, as is described above, one of the users (either the call initiator or the callee) can press the call button 506 on his or her calling station to convert the current simplex call (i.e., Push To Talk Dispatch call) into a duplex call. In the conversion of the simplex call to a duplex call, the current session created by SIP Call manager for the simplex call is reused and the initiating communications station sends a re-INVITE SIP message to server 102 with the SDP message having its 'a=sendrecv' set, which sets the media for that call into the duplex mode. The server 102 forwards the re-INVITE request SIP message to the other communications station, which in turn acknowledges the request for conversion of the current simplex call into a duplex call after the user of that station presses an accept button, such as the call button 506.

When the re-INVITE SIP message is sent with 'a=sendrecv' option during a simplex call, the RTP module either decodes incoming packets (while in listening mode) or encodes outgoing RTP packets (while in talk or transmit mode). When the user of that communications station decides to convert the simplex call into a duplex call, the RTP module changes its configuration to simultaneously encode and decode the outgoing and incoming RTP packets (which results in the call being converted to duplex mode). As the RTP module has been initialized and is either decoding or encoding, it just requires one message to convert the current setting to simultaneously decode and encode. The re-INVITE SIP message received by the callee also causes the same reconfiguration in that communications station after the user accepts to convert the existing call.

Therefore, within the same call session, a simplex call can be converted into duplex call with couple of SIP message exchanged between the caller, callee and the server.

An exemplary re-INVITE message for converting the existing simplex call to duplex is illustrated in TABLE 3.

TABLE 3

```
INVITE sip:bob@biloxi.com SIP/2.0
Via: SIP/2.0/UDP pc33.atlanta.com;branch=z9hG4bK776asdhds
Max-Forwards: 70
To: Bob <sip:bob@biloxi.com>
```

TABLE 3-continued

```
From: Alice <sip:alice@atlanta.com>;tag=1928301774
Call-ID: a84b4c76e66710@pc33.atlanta.com
CSeq: 314159 INVITE
Contact: <sip:alice@pc33.atlanta.com>
Content-Type: application/sdp
Content-Length: 142
v=0
o=mhandley 2890844526 2890842807 IN IP4 126.16.64.4
s=SDP Seminar
i=A Seminar on the session description protocol
u=http://www.cs.ucl.ac.uk/staff/M.Handley/sdp.03.ps
e=mjh@isi.edu (Mark Handley)
c=IN IP4 224.2.17.12/127
t=2873397496 2873404696
a=sendrecv
m=audio 49170 RTP/AVP 0
```

In response to re-INVITE SIP message such as is illustrated in TABLE 3, a communications station transmits a "200 OK" SIP message, such as is illustrated in TABLE 4.

TABLE 4

```
SIP/2.0 200 OK
Via: SIP/2.0/UDP server10.biloxi.com
    ;branch=z9hG4bKnashds8;received=192.0.2.3
Via: SIP/2.0/UDP bigbox3.site3.atlanta.com
    ;branch=z9hG4bK77ef4c2312983.1;received=192.0.2.2
Via: SIP/2.0/UDP pc33.atlanta.com
    ;branch=z9hG4bK776asdhds ;received=192.0.2.1
To: Bob ;tag=a6c85cf
From: Alice ;tag=1928301774
Call-ID: a84b4c76e66710@pc33.atlanta.com
CSeq: 314159 INVITE
Contact:
Content-Type: application/sdp
Content-Length: 131
v=0
o=mhandley 2890844526 2890842807 IN IP4 126.16.64.4
s=SDP Seminar
c=IN IP4 124.2.17.12/127
t=2873397496 2873404696
a=sendrecv
m=audio 49170 RTP/AVP 0
```

There are two things to be observed in the above messages which are used to convert an existing simplex call into a duplex call. First, the Call-ID (call identifier) is the same in the re-INVITE message indicating that the caller is reusing the current call details. Second, the SDP message contains "a=sendrecv" to state that the call will be able to send and receive audio packets.

The present invention can be realized in hardware, software, or a combination of hardware and software. A system according to an exemplary embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The terms "between" and "among" are not to be interpreted as limiting, the use of "between" alone is not to be interpreted as a term of limitation that restricts an action to only two objects, and the use of "among" alone is not to be interpreted as a term of limitation that excludes an action from operating upon only two objects.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method for communicating among at least two devices over a data network, the method comprising:
   establishing a voice communications session in a session over a data link between a first station and at least one remote station, the session operating in a first mode that is one of a simplex mode and a duplex mode;
   sending a control command over the data link to change from the first mode to a second mode, the second mode being a mode different from the first mode;
   changing, while maintaining the session, the session from the first mode to the second mode; and
   communicating between the first station and at least one remote station in a session operating in the second mode.

2. The method according to claim 1, further comprising:
   accepting a request from a third station for a simplex communications session with the first station; and
   responding at the first station to the request by establishing a simplex session from the first station to the third station while maintaining the voice communications session.

3. The method according to claim 1, wherein the data link comprises a data link based upon an Internet Protocol.

4. The method according to claim 3, wherein at least one of the control command and messages used for maintaining the session comprise at least one message defined by at least one of Session Initiation Protocol and Session Description Protocol.

5. A method for communicating among at least three devices, the method comprising:
   establishing a duplex communications session over a data link between a first station and a second station;
   accepting a request from a third station for a simplex communications session with the first station; and
   responding at the first station to the request by establishing a simplex session from the first station to the third station while maintaining the duplex communications session.

6. The method according to claim 5, wherein the simplex session comprises one of a text message transmission and a simplex voice call session.

7. The method according to claim 5, wherein messages defined under a Session Initiation Protocol are used for at least one of establishing the simplex session and maintaining the duplex communications session.

8. The method according to claim 5, wherein the data link comprises a data link based upon an Internet Protocol.

9. The method according to claim 8, wherein the request comprises at least one message defined by at least one of Session Initiation Protocol and Session Description Protocol.

10. A wireless communications controller, comprising:
    a call initiation controller that establishes a voice communications session in a session over a data link between a first station and at least one remote station, the session operating in a first mode that is one of a simplex mode and a duplex mode;
    a mode change controller that performs one of sending and receiving a control command over the data link to change from the first mode to a second mode, the second mode being a mode different from the first mode; and
    a mode controller that changes, while maintaining the session, the session from the first mode to the second mode.

11. The wireless communications controller according to claim 10, wherein the data link comprises a data link based upon the Internet Protocol.

12. The wireless communications controller according to claim 10, wherein the control command comprises at least one message defined by at least one of Session Initiation Protocol and Session Description Protocol.

13. The wireless communications controller according to claim 10, further comprising at least one of a network server and a wireless device, the at least one network server and wireless device operating to perform voice communications among at least two stations.

14. A wireless communications controller, comprising:
    a call initiation controller that establishes a duplex communications session over a data link between a first station and a second station;
    a call request receiver that accepts a request from a third station for a simplex communications session with the first station; and
    a second call session controller that responds to the request by establishing a simplex session from the first station to the third station while maintaining the duplex communications session.

15. The wireless communications controller according to claim 14, wherein the simplex session comprises one of a text message transmission and a simplex voice call session.

16. The wireless communications controller according to claim 14, wherein messages defined under a Session Initiation Protocol are used for at least one of establishing the simplex session and maintaining the duplex communications session.

17. The wireless communications controller according to claim 14, wherein the data link comprises a data link based upon an Internet Protocol.

18. The wireless communications controller according to claim 17, wherein the request comprises at least one message defined by at least one of Session Initiation Protocol and Session Description Protocol.

19. A computer readable storage medium embodying a computer program for controlling communication among at least two devices over a data network, the computer program comprising instructions for:
- establishing a voice communications session in a session over a data link between a first station and at least one remote station, the session operating in a first mode that is one of a simplex mode and a duplex mode;
- sending a control command over the data link to change from the first mode to a second mode, the second mode being a mode different from the first mode; and
- changing, while maintaining the session, the session from the first mode to the second mode.

20. The computer program product according to claim 19, wherein at least one of the control command and messages used for maintaining the session comprise at least one message defined by at least one of Session Initiation Protocol and Session Description Protocol.

* * * * *